United States Patent Office 3,278,653
Patented Oct. 11, 1966

3,278,653
PHOSPHORAMIDATES
Morris L. Nielsen, Dayton, Ohio, assignor to Monsanto Research Corporation, St. Louis, Mo., a corporation of Delaware
No Drawing. Filed July 29, 1963, Ser. No. 298,436
8 Claims. (Cl. 260—944)

This invention relates to nitrogenous organic compounds of phosphorus and more particularly provides a new and valuable class of N-substituted phosphoramidates.

According to the invention there are provided aromatic N-(aminohydrocarbyl)phosphoramidates by the condensation of an aromatic hydrocarbyl phosphorodihalidate with an arylene diamine, and hydrolyzing the product, substantially according to the scheme:

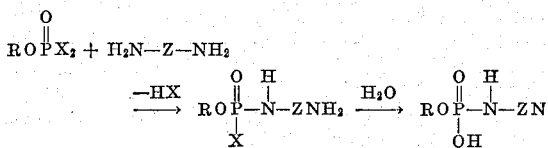

where R is an aromatic hydrocarbon radical which is free of olefinic and acetylenic unsaturation and contains from 6 to 12 carbon atoms and Z is a bivalent aromatic hydrocarbon radical which is free of olefinic and acetylenic unsaturation, contains from 6 to 12 carbon atoms, and is linked to the nitrogen atoms through nuclear carbon atoms, and X is halogen having an atomic weight of at least 35.

Useful aromatic hydrocarbyl phosphorodihalidates include, e.g., phenylphosphorodichloridate, phosphorodibromidate or phosphorodiiodidate, o-, m- or p-tolylphosphorodibromidate or phosphorodichloridate, pentamethylphenylphosphorodichloridate or phosphorodiiodidate, o-, m-, or p-tert-butylphenylphosphorodibromidate or phosphorodichloridate, o-, m- or p-hexylphenylphosphorodichloridate or phosphorodibromidate, o-, m- or p-biphenylylphosphorodichloridate or phosphorodibromidate, α- or β-naphthylphosphorodichloridate or phosphorodiiodidate, o-, m- or p-cyclohexylphenylphosphorodichloridate or phosphorodibromidate, o-, m- or p-cyclopropylphenylphosphorodibromidate or phosphorodiiodidate, 1- or 3-acenaphthenylphosphorodibromidate or phosphorodichloridate, etc.

The arylene diamines which react with said phosphorochloridates to give the presently provided phosphoramidates are, e.g., o-, m- or p-phenylenediamine, toluene-2,5- (or 2,3 or 3,4 or 3,6)-diamine such as 4-butyl-m-phenylenediamine, 4-ethyl-m-phenylenediamine, 4,5-dimethyl-o-phenylenediamine, 2-hexyl-p-phenylenediamine, 2,3,5,6-tetramethylphenylenediamine, 2,5-diethyl-p-phenylenediamine, 2-cyclohexylphenylenediamine, benzidine, 1,5-(or 1,8- or 2,7)-naphthalenediamine, etc.

Thus, reaction of phenyl phosphorodichloridate, phosphorodibromidate or phosphorodiiodidate with o-, m- or p-phenylenediamine yields phenyl N-(o-, m, or p-aminophenyl)phosphoramidate and when the diamine is a toluenediamine the product is a phenyl N-(ar-aminotolyl) phosphoramidate, wherein ar denotes substitution of the amino radical at nuclear carbon, the position of said radical depending upon the individual toluenediamine which is employed as starting material. Similarly, o-, m- or p-ethylphenyl phosphorodichloridate, phosphorodibromidate or phosphorodiiodidate with o-, m- or p-phenylenediamine yield, o-, m- or p-biphenylyl N-(o-, m- or p-aminophenyl) phosphoramidate; o-, m- or p-biphenylyl phosphorochloridate or dibromidate and o-, m- or p-phenylenediamine yield, o-, m- or p-biphenylyl N-(o-, m- or p-aminophenyl) phosphoramidate; o-, m- or p-cyclohexyl phosphorochloridate and toluene-2,5-diamine yield o-, m- or p-cyclohexyl N-(4-amino-2-methylphenyl)phosphoramidate, α- or β-naphthyl phosphorodichloridate and 2-hexyl-p-phenylenediamine yield α- or β-naphthyl N-(4-amino-2-hexyl)phosphoramidate; pentamethylphenyl phosphorodibromidate and benzidine yield pentamethylphenyl N-(4-aminobiphenylyl)phosphoramidate, etc.

Reaction of the hydrocarbon phosphorodihalidate with the arylenediamine to give the presently provided hydrocarbyl N-(aminohydrocarbyl)phosphoramidates proceeds by replacement of one of the halogen atoms of the dihalidate by an (aminohydrocarbylamino) radical and hydrolysis of the residual acyl halogen to the free acid. Said hydrolysis may be effected by conducting the condensation reaction in the presence of water; or if water is not present during said reaction, by treating the mono-substituted, condensation product with water. Preferably, hydrolysis is effected subsequent to the condensation step.

Advantageously, in order to obtain smooth reaction and optimum yield of the product, the reaction is conducted in the presence of an inert organic liquid diluent or solvent, which may be, e.g., an aliphatic or aromatic hydrocarbon such as hexane, benzene or xylene, a chlorinated hydrocarbon such as chloroform, carbon tetrachloride or chlorobenzene; an ether such as butyl ether, morpholine or tetrahydrofuran; a tertiary amide such as dimethylformamide; a sulfoxide such as dimethyl sulfoxide, etc.

The reaction is generally exothermic; hence, heating is usually not required and the condensation and/or hydrolysis may be conducted by operating at ambient temperatures, or even with cooling. However, heating may be desired to assure complete reaction. Also, when working with the somewhat sluggish hydrocarbylphosphorodihalidates, e.g., biphenylyl phosphorodichloridate or β-naphthyl phosphorodichloridate, heating may be used for the purpose of decreasing reaction time. Temperatures of from, say, 60° C. to 150° C. are thus useful. When working in the presence of a diluent or solvent, refluxing temperatures of the reaction mixture are conveniently employed to assure completion of the reaction.

Since reaction occurs with production of hydrogen halide; it is conveniently effected in the presence of a basic agent which will serve as hydrogen halide scavenger by forming a solid hydrohalide. Conveniently, an excess of the arylenediamine may be used for this purpose. However, it may be any organic or inorganic base which does not react with the phosphonic dihalide in preference to the diamine, e.g., a tertiary alkylamine such as trimethylamine or tributylamine or heterocyclic nitrogen base such as N-methylmorpholine or pyridine. An excess of the arylenediamine is preferred.

Instead of using a hydrogen halide scavenger, or together with the scavenger, mechanical provision may be made for removal of the halide as it is formed, e.g., by means of vigorous stirring and/or dephlegmation.

One mole of the aromatic hydrocarbyl phosphorodihalidate reacts with one mole of the arylenediamine to give the present phosphoramidates; hence, the two reactants may be employed in such stoichiometric proportions. However, as above-stated, an excess of the diamine is conveniently used for the purpose of serving as scavenger for the by-product hydrogen halide. The resulting hydrohalide is readily removed from the reaction product by filtering or centrifuging, since it is insoluble in most organic solvents and in the reactants. Any excess of the phosphorodihalidate or of diamine may be separated by distillation. Preferably the quantity of basic agent which is used is sufficient to effect removal of the by-product hydrogen halide which results from the condensation reaction, and also to effect hydrolysis of residual acyl halogen to free acid. For that reason, in order to obtain optimum yields of the desired product, about two moles of base per mole of the phosphonic dihalide is advantageously employed.

All of the reaction variables, i.e., nature of diluent, basic agent, temperature, the desirability of effecting hydrolysis by providing water during the condensation reaction or by subsequent treatment of the condensation product with water, etc., can be arrived at readily by easy experimentation. Since reaction is evidenced by change in viscosity and of copious formation of hydrohalide, progress of the reaction can be followed by noting these.

The presently provided aromatic hydrocarbyl N-(aminohydrocarbyl)phosphoramidates are stable, well-defined compounds which are generally high-melting crystalline solids. Because they possess more than one functional group, they are particularly valuable as starting materials for the production of high-molecular weight polymers. The two reactive groups of the present phosphoramidates, i.e., the terminal amino group of the N-substituent and the p-hydroxy group make these compounds suitable for conversion to linear polymers by reaction with, e.g., alkylene dihalides, thus

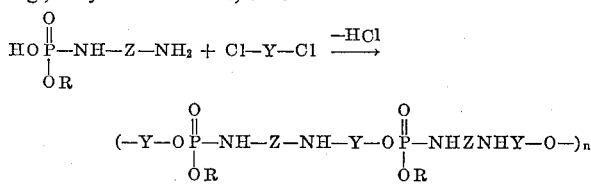

wherein Y is an alkylene or alkyleneoxyalkylene radical of 2 to 8 carbon atoms and R and Z are as defined above. Dihalides which are useful in the above reaction are alkylene or alkyleneoxyalkylene dichlorides, dibromides or diodides such as 1,3-dichloropropane or bis(2-chloroethoxyethyl) ether. Also useful as reactants for conversion of the present phosphoramidates into linear polymers are compounds having two olefinic or acetylenic groups which are known to react with hydroxy or amino compounds by addition across the unsaturated bond, for example, the diacrylates such as ethylene glycol diacrylate or dipropiolates such as the dipropiolates which are disclosed in U.S. Patent No. 3,082,242, issued to Lee A. Miller et al. One mole of the diacrylate or of the dipropiolate combines with one mole of the hydrocarbyl N-(aminohydrocarbyl)phosphoramidate to give a linear polymer having alternating carboxylate and phosphorus amide linkages. Thus, the dipropiolate of 2,2-dimethyl-1,3-propanediol reacts with phenyl N-(4-aminophenyl)phosphoramidate to give a linear polymer having the repeating unit

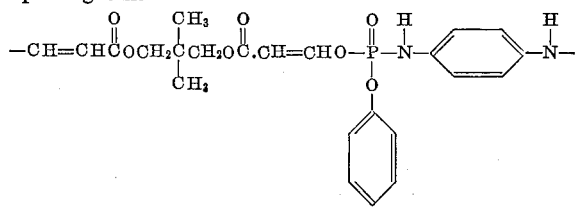

The linear condensation polymers formed by reaction of the present bifunctional phosphoramidates with alkylene dihalides or by the addition polymerization of diacrylates or dipropiolates with said amidates are characterized by very good thermal resistance and solutions thereof are eminently suited for use as coatings in applications where high resistance to heat is required. The polymers may also be molded under heat and pressure to give well-dimenioned molded pieces, or they may be used as adhesives or impregnants in the production of laminates.

The invention is further illustrated by, but not limited to, the following example:

*Example 1*

To 10.8 g. (0.1 mole) of o-phenylenediamine in about 300 ml. of benzene, which had been warmed to solution and then cooled to room temperature there was added dropwise a benzene solution of 10.5 g. (0.05 mole) of phenyl phosphorodichloridate during a 15-minute period. After refluxing the whole for 50 minutes, the benzene was then distilled off and the residue, which comprised the mono-acyl halide, mono-amide, i.e., $$C_6H_5OP(O)(Cl)(NHC_6H_4NH_2),$$

was hydrolyzed by washing repeatedly with cold (10° C.) water. Removal of the water under oil pump vacuum and working up of the residue by dissolving in hot (70° C.) ethanol, filtering and evaporating the filtrate gave the substantially pure phenyl N-(2-aminophenyl)phosphoramidate, M.P. 176° C., and analyzing as follows:

| Percent | Found | Calcd. for $C_{12}H_{13}N_2O_2P$ |
|---|---|---|
| C | 54.30 | 54.55 |
| H | 4.59 | 4.96 |
| N | 10.60 | 10.60 |
| P | 11.55 | 11.72 |

The other phenyl N-(aminophenyl)phosphoramidates, i.e., phenyl N-(3- or 4-aminophenyl)phosphoramidate are obtained when instead of using o-phenylenediamine, there is used m- or p-phenylenediamine.

The present invention is not to be considered as limited by the above example which is given by way of illustration only. It will be obvious to those skilled in the art that many modifications can be made within the spirit of the invention, which is limited only by the terms of the appended claims.

What I claim is:
1. The compound of the formula

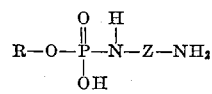

where R is an aromatic hydrocarbon radical which is free of olefinic and acetylenic unsaturation and contains from 6 to 12 carbon atoms and Z is a bivalent aromatic hydrocarbon radical which is free of olefinic and acetylenic unsaturation, contains from 6 to 12 carbon atoms, and is linked to the nitrogen atoms through nuclear carbon.

2. The compound of the formula

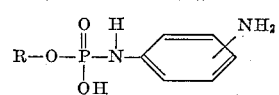

where R is an aromatic hydrocarbon radical which is free of olefinic and acetylenic unsaturation and contains from 6 to 12 carbon atoms.

3. Phenyl N-(aminophenyl)phosphoramidate.
4. Phenyl N-(2-aminophenyl)phosphoramidate.
5. The method which comprises contacting a dihalide of the formula

wherein R is an aromatic hydrocarbon radical which is free of olefinic and acetylenic unsaturation and contains from 6 to 12 carbon atoms and X is halogen having an atomic weight of at least 35 with a diamine of the formula $H_2N-Z-NH_2$ where Z is a bivalent aromatic hydrocarbon radical which is free of olefinic and acetylenic unsaturation, contains from 6 to 12 carbon atoms, and is linked to the nitrogen atoms through nuclear carbon, treating the resulting reaction product with water to effect hydrolysis and recovering from the hydrolysis product the compound of the formula

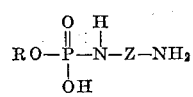

where R and Z are as above defined.

6. The method which comprises contacting a dihalide of the formula

where R is an aromatic hydrocarbon radical which is free of olefinic and acetylenic unsaturation and contains from 6 to 12 carbon atoms and X is halogen having an atomic weight of at least 35 with a molar excess of phenylenediamine, treating the resulting reaction product with water to effect hydrolysis, and recovering from the resulting hydrolysis product the compound of the formula

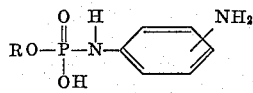

wherein R is as defined above.

7. The method which comprises refluxing a phenyl phosphorodihalidate wherein the halogen has an atomic weight of less than 35 with a molar excess of phenylenediamine, treating the resulting reaction product with water to effect hydrolysis, and recovering phenyl N-(aminophenyl)phosphoramidate from the resulting hydrolysis product.

8. The method which comprises refluxing phenyl phosphorodichloridate with a molar excess of o-phenylenediamine, treating the resulting reaction product with water to effect hydrolysis, and recovering phenyl N-(2-aminophenyl)phosphoramidate from the resulting hydrolysis product.

No references cited.

CHARLES B. PARKER, *Primary Examiner.*

FRANK M. SIKORA, *Assistant Examiner.*

UNITED STATES PATENT OFFICE
CERTIFICATE OF CORRECTION

Patent No. 3,278,653                          October 11, 1967

Morris L. Nielsen

It is hereby certified that error appears in the above numbered patent requiring correction and that the said Letters Patent should read as corrected below.

Column 1, lines 17 to 23, the formula should appear as shown below instead of as in the patent:

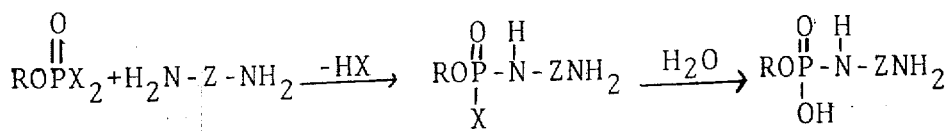

same column 1, line 67, after "or", first occurrence, insert
-- p-ethylphenyl N-(o-,m- or p-aminophenyl)phosphoramidate; o-, m- or p-biphenylyl phosphorodichloridate or dibromidate and o-, m- or p-phenylenediamine yield, o-, m- or --; line 68, beginning with "p-biphenylyl" strike out all to and including "o-, m-, or", in line 71, same column 1; column 3, line 67, for "well-dimenioned" read -- well-dimensioned --; column 4, line 64, for "abivalent" read -- a bivalent --.

Signed and sealed this 9th day of January 1968.

(SEAL)
Attest:

EDWARD M. FLETCHER, JR.                        EDWARD J. BRENNER
Attesting Officer                             Commissioner of Patents